United States Patent
Liu et al.

(10) Patent No.: US 6,816,367 B2
(45) Date of Patent: Nov. 9, 2004

(54) DRIVE BRACKET ASSEMBLY FOR COMPUTER ENCLOSURE

(75) Inventors: Alvin Liu, Tu-Chen (TW); Li-Ping Chen, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 152 days.

(21) Appl. No.: 10/301,439

(22) Filed: Nov. 20, 2002

(65) Prior Publication Data

US 2004/0017650 A1 Jan. 29, 2004

(30) Foreign Application Priority Data

Jul. 26, 2002 (TW) ..................................... 91211443 U

(51) Int. Cl.⁷ ................................................. G06F 1/16
(52) U.S. Cl. ..................... 361/685; 361/724; 312/223.2; 248/200
(58) Field of Search ................................ 361/685, 683, 361/679, 724–727; 211/26, 41; 248/581, 608, 611, 126, 200, 220.22; 312/223.1, 223.2

(56) References Cited

U.S. PATENT DOCUMENTS

| | | | | |
|---|---|---|---|---|
| 5,668,696 A | * | 9/1997 | Schmitt .......................... 361/685 |
| 5,995,364 A | * | 11/1999 | McAnally et al. ............ 361/685 |
| 6,137,684 A | * | 10/2000 | Ayd et al. ..................... 361/685 |
| 6,381,131 B1 | * | 4/2002 | Liu et al. ...................... 361/685 |
| 6,437,977 B1 | * | 8/2002 | Yu ................................ 361/685 |
| 6,530,551 B2 | * | 3/2003 | Gan .......................... 312/223.2 |
| 6,616,106 B1 | * | 9/2003 | Dean et al. .................. 361/685 |
| 6,625,014 B1 | * | 9/2003 | Tucker et al. ................ 361/685 |

* cited by examiner

*Primary Examiner*—Lisa Lea-Edmonds
(74) *Attorney, Agent, or Firm*—Wei Te Chung

(57) ABSTRACT

A drive bracket assembly includes a handle (10), a fixed base (20), and a drive bracket (30). The handle includes a crossbar (11) and a pair of side arms (12). A pair of protrusions (13) is inwardly formed from the side arms respectively. A pair of tabs (16, 18) depends from a free end of each side arm. The base includes a fixed frame (22) and a connecting board (26). A plurality of slots (261, 262) is defined in the connecting board corresponding to the tabs respectively. The drive bracket includes a pair of sidewalls (34). A pair of guideways (345) is formed in the sidewalls, corresponding to the protrusions. In assembly, the handle is pivotably attached to the drive bracket, and the handle is rotated to cause the tabs to be engagingly received in the slots and the protrusions to be snappingly engaged in the guideways.

22 Claims, 3 Drawing Sheets

US 6,816,367 B2

DRIVE BRACKET ASSEMBLY FOR COMPUTER ENCLOSURE

BACKGROUND OF THE INVENTION

1. Field of the Invention

The present invention relates to computer enclosures, and more particularly to drive bracket assemblies for computer enclosures.

2. Description of the Related Art

Various data storage devices are installed in computers for communication and handling of data. Such devices include, for example, hard disk drives (HDD), floppy disk drives, and compact disc read-only memory (CD-ROM) drives. A drive bracket is often included in a computer enclosure for accommodating a data storage device therein. A conventional drive bracket is attached to a computer enclosure with bolts or rivets. However, attachment with bolts or rivets is unduly complicated and time-consuming. In a typical computer enclosure, there is a relatively large space under the installed drive bracket for accommodating other components of the computer. However, installation or maintenance of such other components under the drive bracket is difficult. This is because the drive bracket must ordinarily be removed to provide access to the space, and the drive bracket is not readily removable after it has been attached to the computer enclosure.

SUMMARY OF THE INVENTION

Accordingly, an object of the present invention is provide a drive bracket assembly which is readily attached to a computer enclosure and easily released from a fixed position within the enclosure.

Another object of the present invention is to provide a drive bracket assembly that facilitates easy installation or maintenance of other components located near a drive bracket in a computer enclosure.

To achieve the above objects, a drive bracket assembly for a computer enclosure in accordance with the present invention comprises a handle, a fixed base and a drive bracket. The handle comprises a crossbar and a pair of side arms depending from opposite ends of the crossbar respectively. A pair of protrusions is inwardly formed from the side arms respectively. A pair of tabs depends from a free end of each side arm. The base comprises a fixed frame and a connecting board. A plurality of arch-shaped cutouts is defined in edge portions of the fixed frame. A plurality of slots is defined in the connecting board corresponding to the tabs respectively. The drive bracket comprises a top wall and a pair of sidewalls. A plurality of posts protrudes from the top wall and the sidewalls, corresponding to the cutouts of the connecting board respectively. A pair of guideways is formed in the sidewalls, corresponding to the protrusions. In assembly, the handle is pivotably attached to the drive bracket, and the handle is rotated to cause the posts to be engagingly received in the cutouts, the tabs to be engagingly received in the slots and the protrusions to be snappingly engaged in the guideways. The drive bracket is thus securely attached within the enclosure.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
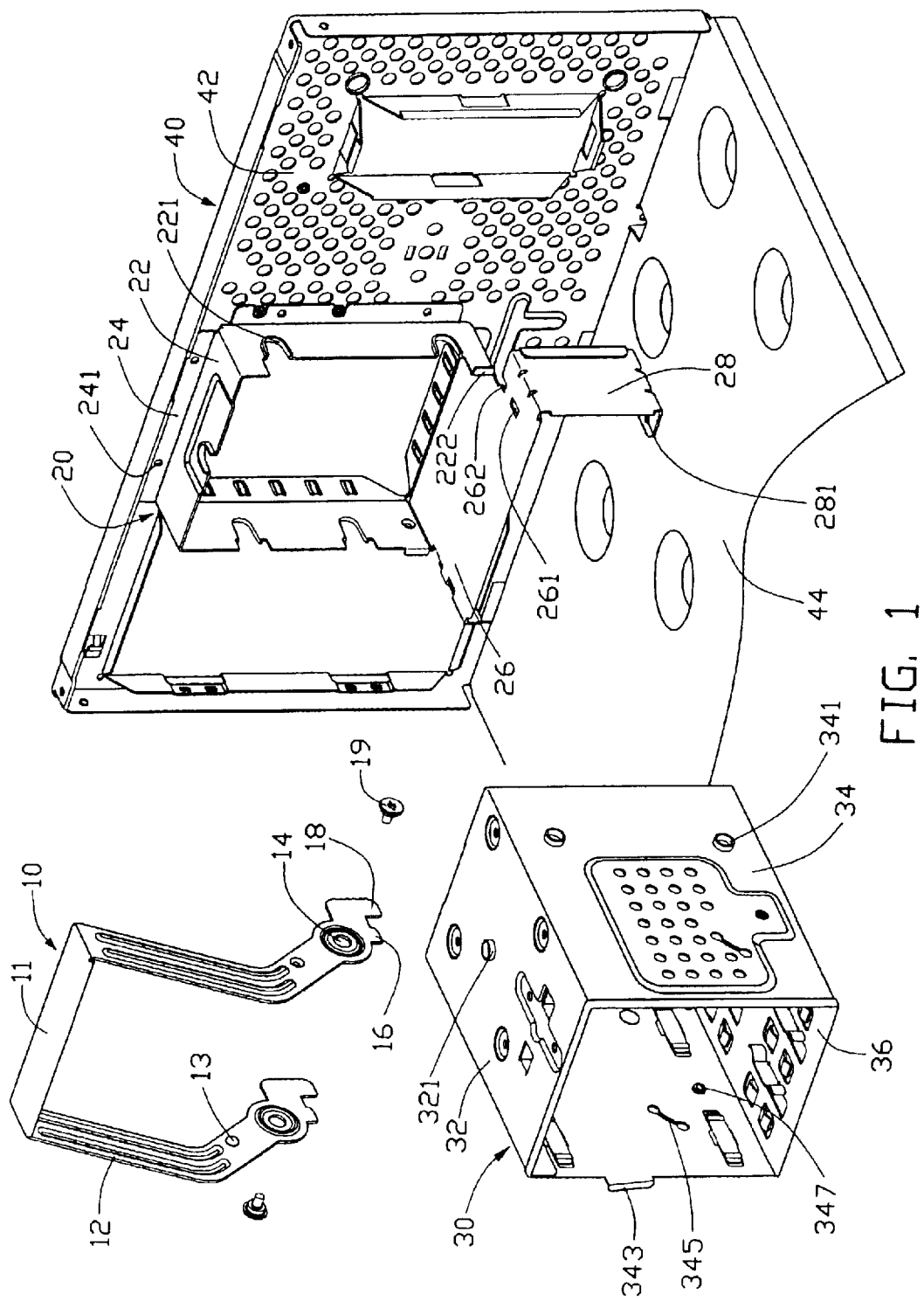
FIG. 1 is an exploded isometric view of a drive bracket assembly in accordance with a preferred embodiment of the present invention together with a cage of a computer enclosure, the drive bracket assembly comprising a drive bracket and a connecting board.

Referring to FIG. 1, a drive bracket assembly in accordance with a preferred embodiment of the present invention comprises a retainer device and a drive bracket 30. The retainer device comprises a rotatable handle 10 and a fixed base 20. The drive bracket assembly is attached to a cage 40 of a computer enclosure.

The handle 10 comprises a crossbar 11, and a pair of parallel side arms 12 depending from opposite ends of the crossbar 11 respectively. Each side arm 12 is generally L-shaped, such that an angle in an elbow of the side arm 12 is obtuse. A pair of dome-shaped protrusions 13 is inwardly formed from the side arms 12 respectively, below the respective elbows of the side arms 12. A pair of through holes 14 is defined near free ends of the side arms 12 respectively. The through holes 14 are adapted to respectively receive a pair of bolts 19. A diameter of each through hole 14 is greater than a diameter of a rod portion of the corresponding bolt 19, and less than a diameter of a head portion of the corresponding bolt 19. A short tab 16 and a long tab 18 depend from a free end of each side arm 12.

The cage 40 comprises a front panel 42 and a side panel 44. A plurality of vent holes is defined in the front panel 42 and the side panel 44 respectively. The base 20 is riveted to the cage 40.

The base 20 comprises an upper U-shaped fixed frame 22, and a lower horizontal connecting board 26. The fixed frame 22 and connecting board 26 are adapted to cooperatively receive the drive bracket 30. A plurality of arch-shaped cutouts 221 is defined in edge portions of the fixed frame 22 that are distal from the front panel 42 of the cage 40. An inmost portion of each cutout 221 is narrower than an entrance portion thereof. A pair of stopper plates 222 is bent perpendicularly outwardly in respective opposite directions from bottommost portions of the fixed frame 22 respective, adjacent the connecting board 26. A plurality of flanges 24 is bent perpendicularly outwardly from edge portions of the fixed frame 22 that are proximate the front panel 42 of the cage 40. A plurality of spaced holes 241 is defined in the flanges 24, for fastening of the fixed frame 22 to the front panel 42 of the cage 40 with rivets. A pair of aligned slots 261, 262 is defined in the connecting board 26 proximate each of the stopper plates 222. An L-shaped sidewall 28 depends from one side edge of the connecting board 26. A plurality of spaced holes 281 is defined in a bottom horizontal bent plate of the sidewall 28, for fastening of the sidewall 28 to the side panel 44 of the cage 40 with rivets.

The drive bracket 30 comprises a top wall 32, a bottom wall 36 and a pair of sidewalls 34. A post 321 protrudes upwardly from a middle portion of the top wall 32. A pair of vertically spaced posts 341 protrudes from each sidewall 34. A stopper plate 343 is bent outwardly from an edge of one of the sidewalls 34, the edge being distal from the front panel 42 of the cage 40. A pair of arcuate guideways 345 is formed in the sidewalls 34, corresponding to the protrusions 13 of the handle 10. Each guideway 345 comprises a pair of bores defined in the sidewall 34 at respective opposite ends of a main portion of the guideway 345. A pair of hollow sockets 347 extends inwardly from the sidewalls 34 respectively. Each socket 347 has an inner thread. The drive bracket 30 can be rotatably attached to the handle 10 by the bolts 19 extending through the through holes 14 of the handle 10 and engaging with the sockets 347.

Figure 2:
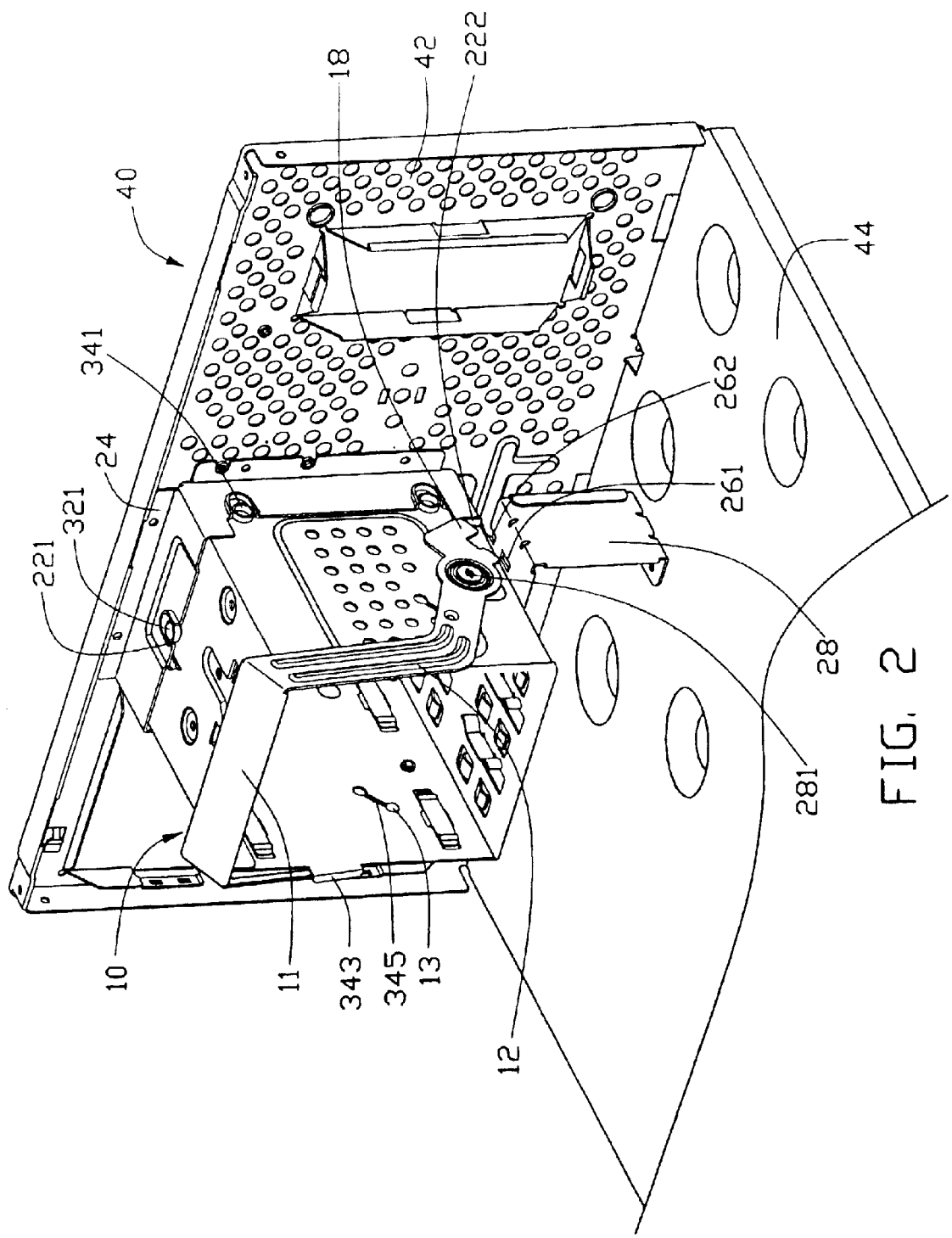
FIG. 2 is a partly assembled view of FIG. 1, showing the drive bracket resting on the connecting board.
Figure 3:
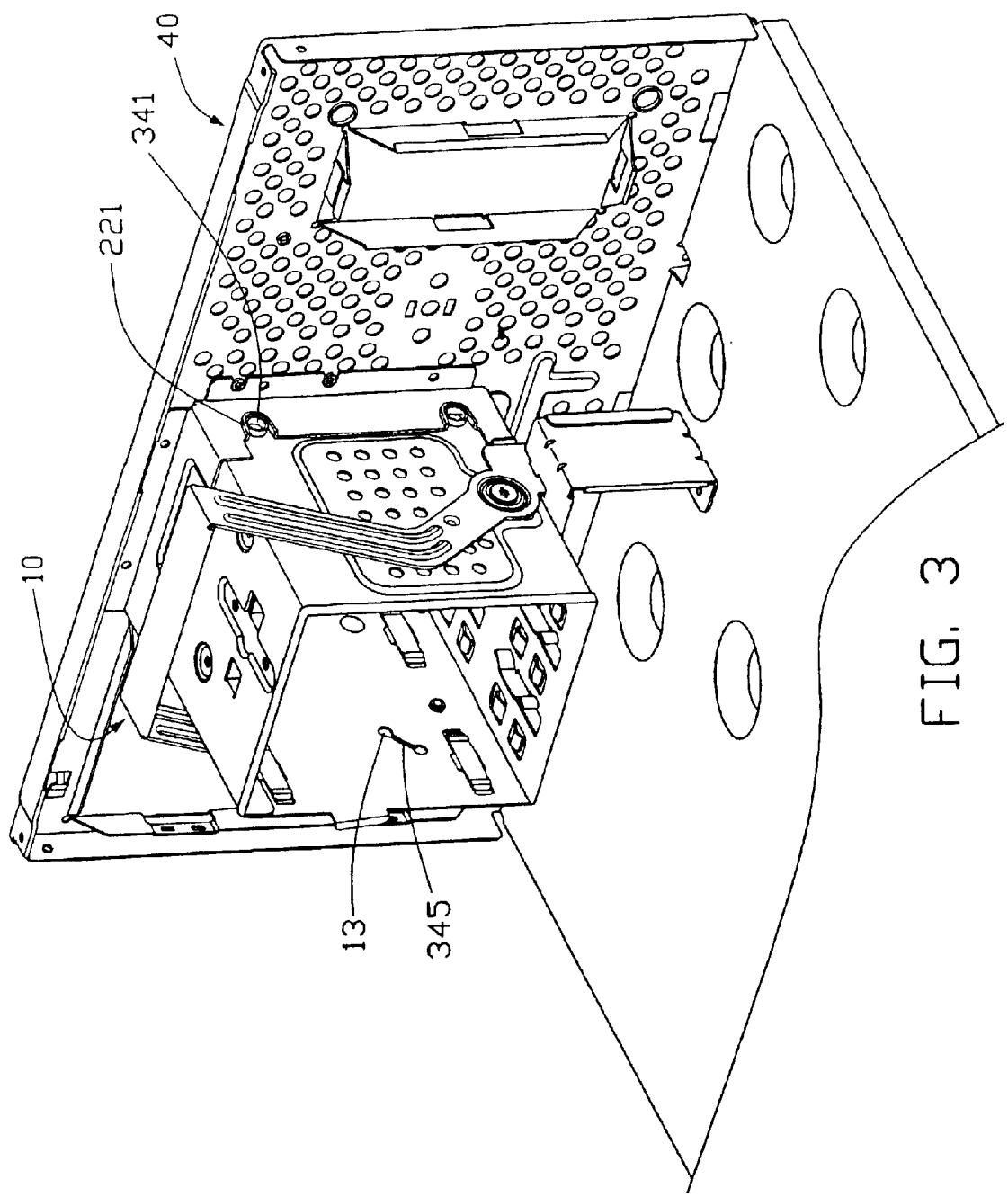
FIG. 3 is a fully assembled view of FIG. 1, showing the drive bracket assembly securely attached to the cage.

Referring particularly to FIGS. 2 and 3, in assembly, the base 20 is attached to the cage 40 with rivets. The bolts 19 are extended through the through holes 14 of the handle 10 to engage in the corresponding sockets 347 of the drive bracket 30. The handle 10 is thus rotatably attached to the drive bracket 30, and can be rotated about the sockets 347. One side arm 12 of the handle 10 rests on the stopper plate 343, and the protrusions 13 are snappingly engaged in corresponding bores of the guideways 345 which are distal from the front panel 42 of the cage 40. At this stage, the handle 10 is defined as being in a first position. Then, a plurality of HDDs (not shown) is installed in the drive bracket 30. The combined HDDs, handle 10 and drive bracket 30 is placed on the connecting board 26 and pushed toward the front panel 42 until the long tabs 18 of the handle 10 contact the stopper plates 222 of the base 20. The posts 321, 341 of the drive bracket 30 are thus simultaneously partly received in the cutouts 221 of the base 20. Then the handle 10 is rotated toward the front panel 42, such that the protrusions 13 slide along the guideways 345. During such rotation, the crossbar 11 of the handle 10 reaches a highest position above the bottom wall 36 of the drive bracket 30, and then gradually continues to lower positions. The short tabs 16 of the handle 10 are received in the slots 261 of the base 20, the long tabs 18 are received in the slots 262 of the base 20, the posts 321, 341 are received in inmost portions of the cutouts 221, and the protrusions 13 are snappingly engaged in corresponding bores of the guideways 345 which are proximate to the front panel 42. At this stage, the handle 10 is defined to be in a second position. A side panel (not shown) is attached to the front panel 42. The side panel is disposed adjacent to the crossbar 11 of the handle 10, thereby preventing the handle 10 from accidentally rotating away from the front panel 42. Assembly of the drive bracket assembly is thus completed, with the drive bracket 30 securely attached to the cage 40.

A user may need to access a region between the drive bracket 30 and the side panel 44 of the cage 40. This may be required, for example, when the user needs to maintain or install components in that region. To access the region, the user removes the side panel (not shown) attached to the front panel 42. The user then need only rotate the handle 10 away from the front panel 42 until said one side arm 12 abuts the stopper plate 343. The drive bracket 30 can then be easily pulled away from the front panel 42.

While the present invention has been illustrated by the description of the preferred embodiment thereof, and while the embodiment has been described in considerable detail, it is not intended to restrict or in any way limit the scope of the appended claims to such detail. Additional advantages and modifications will readily appear to those skilled in the art. Therefore, the present invention is not limited to the specific details and illustrative examples shown and described.

What is claimed is:

1. A drive bracket assembly for a computer enclosure, the drive bracket assembly comprising:
   a fixed base comprising a fixed frame and a connecting board;
   a drive bracket comprising a pair of sidewalls each having a guideway; and
   a handle pivotably attached to the drive bracket, the handle comprising a crossbar and a pair of side arms, each of the side arms comprising an engaging means for engaging with the connecting board and a sliding means for sliding along a corresponding guideway;
   wherein when the handle is rotated from a first position to a second position, the sliding means are slid along the guideways to push the drive bracket into the fixed frame and cause the engaging means to engage with the connecting board, thereby securing the drive bracket to the fixed base.

2. The drive bracket assembly as claimed in claim 1, wherein the drive bracket further comprises an upper wall, a plurality of posts protrudes from the upper wall and the sidewalls, and a plurality of cutouts is defined in the fixed frame for engagingly receiving the posts.

3. The drive bracket assembly as claimed in claim 2, wherein a socket is arranged on each of the sidewalls, and a pair of fasteners is extended through the side arms of the handle and the sockets, thereby pivotably attaching the handle to the drive bracket.

4. The drive bracket assembly as claimed in claim 1, wherein a stop is arranged at an end of one of the sidewalls, for supporting the handle in the first position.

5. The drive bracket assembly as claimed in claim 1, wherein each of the guideways is arcuate, and comprises a pair of bores at opposite ends thereof.

6. The drive bracket assembly as claimed in claim 1, wherein the side arms extend from opposite ends of the crossbar, and each of the side arms is generally L-shaped such that an angle in an elbow of the side arm is obtuse.

7. The drive bracket assembly as claimed in claim 6, wherein the sliding means comprises a generally dome-shaped protrusion protruding from the side arm.

8. The drive bracket assembly as claimed in claim 6, wherein the engaging means comprises a plurality of tabs, the tabs are formed at a free end of each of the side arms, and a plurality of slots is defined in the connecting board for engagingly receiving the tabs.

9. The drive bracket assembly as claimed in claim 7, wherein a pair of stops is arranged at the fixed frame for abutting proximate tabs of the side arms.

10. An enclosure assembly comprising:
    a cage comprising a first panel and a second panel;
    a drive bracket comprising a pair of sidewalls each having a guideway;
    a handle pivotably attached to the drive bracket, the handle comprising a crossbar and a pair of side arms, at least one tab being formed at a free end of each of the side arms, a sliding means protruding from each of the side arms and movably engaging with a corresponding guideway; and
    a fixed base attached in the cage, the fixed base comprising a fixed frame fixed on inside of the first panel and a connecting board perpendicular to the first panel, at least two slots being defined in the connecting board for engagingly receiving the at least one tabs;
    wherein the handle is rotatable with the sliding means sliding in the guideways such that it can push the drive bracket toward the fixed frame and cause the at least one tabs to be engagingly received in the at least two slots thereby securing the drive bracket in the cage.

11. The enclosure assembly as claimed in claim 10, wherein the side arms extend from opposite ends of the crossbar, and each of the side arms is generally L-shaped such that an angle in an elbow of the side arm is obtuse.

12. The enclosure assembly as claimed in claim 11, wherein the sliding means comprises a generally dome-shaped protrusion.

13. The enclosure assembly as claimed in claim 12, wherein a hole is defined near a free end of each of the side arms.

14. The enclosure assembly as claimed in claim 10, wherein each of the guideways is arcuate, and comprises a pair of bores at opposite ends thereof.

15. The enclosure assembly as claimed in claim 10, wherein the drive bracket further comprises an upper wall, a plurality of posts protrudes from the upper wall and the sidewalls, and a plurality of cutouts is defined in the fixed frame for engagingly receiving the posts.

16. The enclosure assembly as claimed in claim 10, wherein a pair of stops is arranged at the fixed frame for abutting proximate tabs of the side arms.

17. The enclosure assembly as claimed in claim 16, wherein a plurality of flanges is arranged at a periphery of the fixed frame, and a plurality of holes is defined in the flanges for facilitating attachment of the fixed base to the cage.

18. The enclosure assembly as claimed in claim 17, wherein a sidewall extends from a side of the connecting board, and at least one hole is defined in said sidewall for facilitating attachment of the fixed base to the cage.

19. An enclosure assembly comprising:
   a panel with a fixed base defining first retention means facing to a first direction opposite to the panel, and second retention means facing to a second direction perpendicular to said first direction;
   a drive bracket including first securing means facing to a third direction opposite to said first direction, said drive bracket being adapted to move back and forth along said first and third directions; and
   a handle pivotally mounted on the drive bracket, said handle defining second securing means opposite to a manipulating bar thereof; wherein
   during assembling, the drive bracket with the pivotal handle first moves toward the fixed base along a third direction until the first retention means and the first securing means are initially engaged with each other to prevent up-and-down movement of the drive bracket relative to the fixed base, and the handle is successively rotated toward the panel to have the second securing means and the second retention means engaged with each other, wherein further rotation of the handle results in further confrontation between the second retention means said second securing means in said first/third directions, which brings about a reaction force to urge the drive bracket and the associated handle to further move along said third direction until the first retention means and first securing means are fully engaged with each other.

20. The assembly as claimed in claim 19, wherein said first retention means is a slot, and said first securing means is a post.

21. The assembly as claimed in claim 19, wherein said second retention means is a slot, and said second securing means is a tab.

22. The assembly as claimed n claim 19, wherein said drive bracket has means for retaining the handle in position when said handle is rotated to a final position.

* * * * *